W. W. FINK.
MOVABLE HEADLIGHT FOR AUTOMOBILES.
APPLICATION FILED APR. 8, 1914.
1,110,431.
Patented Sept. 15, 1914.
2 SHEETS—SHEET 1.
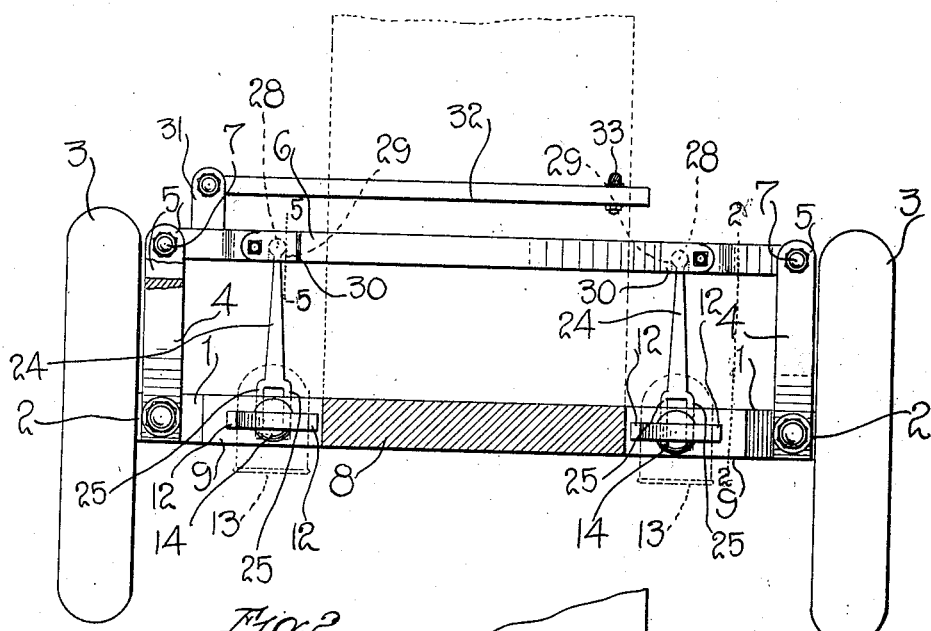
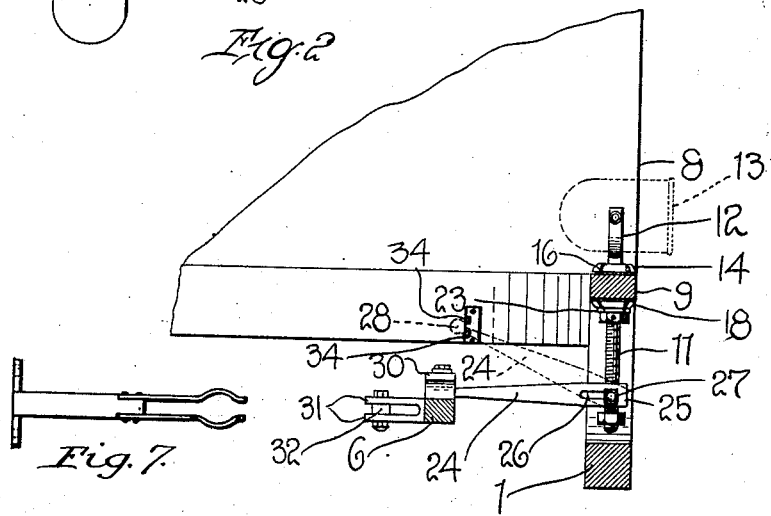
Witnesses
Robert M. Sutphen
A. I. Hind
Inventor
W. W. Fink
By Watson E. Coleman
Attorney W. W. FINK.
MOVABLE HEADLIGHT FOR AUTOMOBILES.
APPLICATION FILED APR. 8, 1914.
1,110,431.
Patented Sept. 15, 1914.
2 SHEETS—SHEET 2.
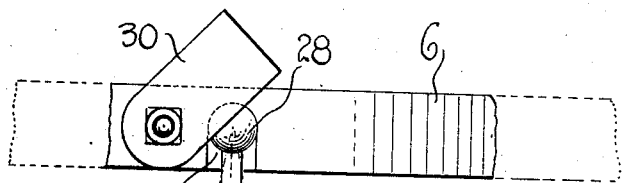
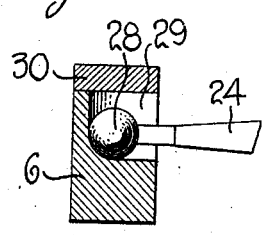
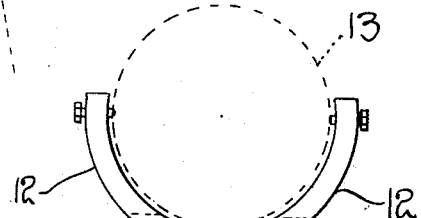
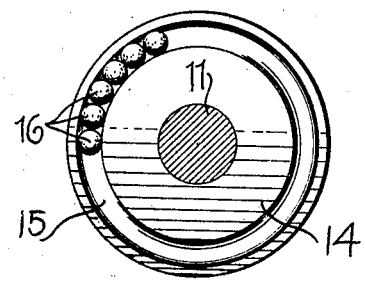
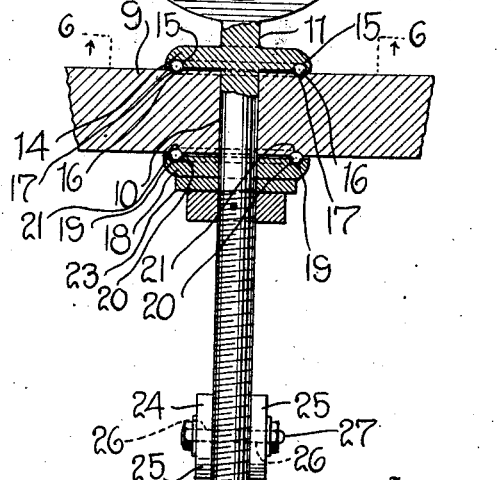
Inventor
W. W. FINK

UNITED STATES PATENT OFFICE.

WALDEN W. FINK, OF CASTLEWOOD, VIRGINIA.

MOVABLE HEADLIGHT FOR AUTOMOBILES.

1,110,431.

Specification of Letters Patent. Patented Sept. 15, 1914.

Application filed April 8, 1914. Serial No. 830,448.

*To all whom it may concern:*

Be it known that WALDEN W. FINK, a citizen of the United States, residing at Castlewood, in the county of Russell and State of Virginia, have invented certain new and useful Improvements in Movable Headlights for Automobiles, of which the following is a specification, reference being had to the accompanying drawings.

This invention relates to new and useful improvements in headlight supports for automobiles and more particularly to that type which are automatically operated by the steering mechanism of the machine, the main object of the invention being the provision of lamp supporting brackets which are connected with the steering gear of the automobile in such a manner that the lamps are turned in unison with the front wheels of the automobile and so arranged that the brackets may be disconnected from the steering gear so that they will not be moved when the steering gear is moved.

Another object of the present invention is the provision of a headlight support of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawings forming a part of this application, Figure 1 is a top plan view illustrating the application of my improved device. Fig. 2 is a detail transverse sectional view taken on the line 2—2, of Fig. 1. Fig. 3 is a top plan view illustrating the removable connection between the transverse steering member and the lamp bracket. Fig. 4 is a longitudinal sectional view illustrating the movable supporting member for the lamp. Fig. 5 is a detail transverse sectional view taken on the line 5—5, of Fig. 1; and Fig. 6 is a transverse sectional view taken on the line 6—6, of Fig. 4. Fig. 7 is a side elevation of a portion of an automobile hood, illustrating the manner of supporting the connecting rods thereon.

Referring more particularly to the drawings, 1 indicates the front axle which is provided at each end thereof with the pivoted spindles 2, upon which are mounted the steering wheels 3. Connected to the body portion of the spindles and projecting rearwardly therefrom, are the connecting links 4, the inner ends of which are bifurcated to form spaced ears 5, between which are mounted the ends of the connecting rod 6, said rod being securely connected with the spaced ears 5 by means of the transverse pivot pin 7.

Formed integral with the forward end of the hood 8 of the machine, are the brackets 9 which comprise the fender of the automobile and are provided at a point adjacent the hood with transverse openings 10 in which the standards 11 are mounted for rotation. The upper ends of the standards 11 are provided with spaced arms 12 between which the lamp 13 is arranged. The standard 11 is provided at substantially a central point with an annular bearing plate 14 which is provided upon its inner face with an annular ball race 15 which is adapted to receive portions of the bearing balls 16, said bearing balls being mounted for rotation within an annular groove or race way 17 formed in the upper face of the bracket 9. Movably mounted upon the standard beneath the bracket 9, is a second bearing plate 18 which is provided at its inner face with an annular race way 19, in which the bearing balls 20 are arranged, said bearing balls being also arranged within the annular race way 21 formed in the lower face of the bracket 9. The bearing plate 18 is securely held in position by means of a removable nut 22 which is threaded upon the lower end of the standard 11 and is adapted to engage with a washer 23 which is arranged between the bearing plate and the nut.

Pivotally secured to the lower end of the standards 11, are the connecting rods 24, said rods being bifurcated to form the spaced ears 25 which are provided with alined slots 26 in which the pin 27 is arranged, whereby to pivotally and slidably mount said connecting rods. The inner ends of the connecting rods 24 are provided with substantially spherical portions 28 which are removably disposed within the sockets 29 formed within the cross rod or connecting rod 6. From this it will be apparent that upon longitudinal movement of the rod 6, the rods 24 will be actuated to rotate the standard 11 within the openings 10 formed in the brackets 9, whereby the lamps 13 will move in unison with the steering wheel. The spherical portions 28 are retained within the sockets 29 by means of a pivoted plate 30 which is adapted to be arranged over the upper open side of the socket.

Formed upon the rear face of the cross bar or connecting rod 6, adjacent one end thereof, are the spaced ears 31. Pivotally mounted between said ears is an actuating rod 32, which connects with the steering rod 33 by having a slotted plate secured to the upper face of said rod and having the lower end of the steering rod projecting through said slot, whereby upon rotary movement of the steering rod, the actuating rod will be reciprocated in order to rotate the standards 11, which are mounted within the brackets 9, said actuating rod also moving the steering wheels in unison with the movement of the lamps.

When it is not desired to use the lamps for rotating them simultaneously with the movement of the steering wheels, the spherical ends of the rods 24 are arranged between the spring arms 34 which are secured to the side of the hood to receive the ends of the rods 24. In order to mount the spring arms 34 in position, the inner ends thereof are secured to the supporting arms 35 which are formed integral with the plates 36, whereby to secure the same to the side of the hood by means of set screws or any other suitable fasteners. From this it will be apparent that when it is not desired to use the steering mechanism for actuating the lamps, the inner ends of the rods 24 are arranged within the clamping arms 34. It will be readily apparent that the spherical portions 28 of the rods may be quickly and readily arranged within the sockets 29 or removed therefrom.

From the above description taken in connection with the accompanying drawings, it will be readily apparent that I have provided a simple and durable head light support for automobiles whereby the lamps are actuated in accordance with the steering mechanism, whereby the hood may be caused to be projected in the direction of travel of the machine, whether in a straight course or in the turning of corners or around curves, thereby lessening the danger of accidents and liability of collisions. It will also be apparent that I have provided a simple and durable attachment for automobiles which is extremely simple in construction and can be manufactured and applied to various makes of automobiles at a comparatively low cost.

While I have shown and described the preferred form of my invention, it will be obvious that various changes in the details of construction and in the proportions may be resorted to for successfully carrying my invention into practice, without sacrificing any of the principles of the invention.

Having thus described this invention, what I claim is—

1. A device of the class described including the hood of a motor vehicle having brackets extending outwardly therefrom, rotatable standards carried thereby, connecting rods having their outer ends bifurcated to form spaced ears, said ears being disposed upon opposite sides of the standards and loosely connected thereto, an actuating rod, and movable means for normally retaining the inner ends of the connecting rods in contact with the actuating rod, means carried by the hood to support said rods when in an inoperative position, and steering mechanism connected with the actuating rod whereby to rotate said standards upon the actuation of the steering mechanism.

2. A device of the class described including the hood of a motor vehicle having brackets extending outwardly therefrom, rotatable standards carried thereby, connecting rods having their outer ends bifurcated to form spaced ears, said ears being disposed upon opposite sides of the standards and loosely connected thereto, an actuating rod, means for removably connecting the inner ends of the first rods with the actuating rod, spring arms carried by the hood and adapted to receive the inner ends of the connecting rods, whereby to retain the standards against rotation, and steering mechanism connected with the actuating rod whereby to rotate the standards upon the actuation of the steering mechanism.

3. A device of the class described including rotatable standards, transverse pins carried by the lower ends of said standards, rods having their outer ends bifurcated to form spaced ears having alined slots formed therein to receive said pins, the inner ends of each of said rods being provided with a spherical portion, a connecting rod having spaced sockets formed therein to receive the spherical ends of the first rods, and movable plates arranged over the upper open ends of said sockets to removably retain the ends of the first rods therein.

In testimony whereof I hereunto affix my signature in the presence of two witnesses.

WALDEN W. FINK.

Witnesses:
A. B. RASNAKE,
N. W. EASTERLY.